United States Patent [19]

Legue, Norris R.

[11] 4,256,615
[45] Mar. 17, 1981

[54] ADHESIVE CONSISTING ESSENTIALLY OF A RICINOLEATE URETHANE POLYOL AND A CHLORINATED RUBBER

[75] Inventor: Legue, Norris R., Scotch Plains, N.J.

[73] Assignee: Synthetic Surfaces, Inc., Scotch Plains, N.J.

[21] Appl. No.: 36,359

[22] Filed: May 7, 1979

[51] Int. Cl.[3] .................. C08G 18/04; C09J 3/12; C09J 3/16
[52] U.S. Cl. .................. 260/18 TN; 156/331; 156/333; 260/23.7 H; 260/407
[58] Field of Search ........... 260/404.5 I, 407, 18 TN, 260/23.7 H; 156/331, 333

[56] References Cited

U.S. PATENT DOCUMENTS

| | | | |
|---|---|---|---|
| 2,769,826 | 11/1956 | Yoho | 156/331 |
| 2,864,780 | 12/1958 | Katz et al. | 260/18 TN |
| 3,505,275 | 4/1970 | Sato et al. | 156/331 |
| 3,539,424 | 11/1970 | Tashlick | 156/331 |
| 3,637,359 | 1/1972 | Malloy et al. | 51/297 |
| 3,770,555 | 11/1973 | Gladstone et al. | 156/331 |
| 3,819,552 | 6/1974 | Glanville et al. | 260/23.7 H |
| 3,872,043 | 3/1975 | Branlard et al. | 260/23.7 H |
| 4,027,435 | 6/1977 | Malloy | 51/298 |
| 4,144,219 | 3/1979 | Malloy | 156/331 |
| 4,156,671 | 5/1979 | Keown et al. | 156/333 |

*Primary Examiner*—Ronald W. Griffin
*Attorney, Agent, or Firm*—Carella, Bain, Gilfillan & Rhodes

[57] ABSTRACT

An adhesive composition consisting essentially of a solution in a suitable solvent of a ricinoleate urethane polyol and a chlorinated rubber in which the chlorinated rubber represents no more than approximately 70% by weight of the combined polyol and rubber.

30 Claims, No Drawings

ADHESIVE CONSISTING ESSENTIALLY OF A RICINOLEATE URETHANE POLYOL AND A CHLORINATED RUBBER

BACKGROUND OF THE INVENTION

Ricinoleate urethane polyols are well known in the art for use in the formulation of adhesives and coatings as plasticizers, pigment dispersing agents and tackifiers as well as a reactive ingredient.

Ricinoleate urethane polyols themselves vary in consistency from high viscosity oils to greases and, while they have some tack, they lack cohesive strength. Thus, they are not employed alone as pressure sensitive adhesives or contact cement nor do they impart cohesive strength to adhesives when used as tackifiers.

Two-package urethane adhesives which cure by the reaction of the hydroxyl groups of the ricinoleate urethane polyol with an isocyanate are strong adhesives when cured but exhibit very little green strength. "Green strength" as used herein means the ability to hold two surfaces together when first contacted and before the adhesive develops its ultimate bonding properties when fully cured.

The degree of green strength exhibited by an adhesive is vital to many applications. High green strength tends to prevent wrinkling and slippage of films during lamination. In panel assembly and packaging, it permits faster handling and wrapping. When an adhesive is applied to a vertical surface, a sufficiently high green strength prevents a mechanically unsupported, bonded member from slipping under the influence of gravity. When employed for flocking, high green strength holds fibers in place while the adhesive cures and in the laying of carpet or synthetic flooring, it resists curling due to the shape-memory thereof acquired when stored in a roll.

Two-package urethane coatings which cure by the same reaction as set forth above with respect to adhesives have good flexibility and toughness but develop film hardness slowly. It is preferable that floor coatings develop hardness sufficient to accept traffic rapidly to minimize down-time whether the coating be used on new construction or existing sites.

Additionally, when urethane coatings and adhesives are applied to concrete, it is currently necessary to acid-etch the concrete prior to application. While acid-etching of the concrete is a prerequisite for excellent adhesion, a higher degree of adhesion to concrete that has not been acid-etched is always desirable by virtue of the fact that when large areas are acid-etched frequently portions thereof are either missed or inadequately etched resulting in poor adhesion.

In accordance with the present invention, it has been found that a mixture of ricinoleate urethane polyol and chlorinated rubber exhibits a unique combination of properties which are not achievable if either product is employed alone or if either product were omitted from certain formulations containing other ingredients. Chlorinated rubber is known for its fast, tack-free dry and for that reason is often added to formulations to quickly eliminate tack which is the very antithesis of its use in adhesives claimed in the present invention resulting in new and unexpected results including converting a ricinoleate urethane polyol from a product with little tack and cohesiveness to one that is tenacious.

A chlorinated rubber/ricinoleate urethane polyol mixture in accordance with the present invention is useful in the formulation of pressure sensitive and curable adhesives, contact cements, protective coatings, curable urethanes and curable coatings. Such mixtures are also useful as tackifying additives, anti-slip additives, flexibilizing agents, cross-linking agents, adhesion improvers and the like. The term "adhesive" as used herein is intended to include broadly, adhesives, coatings and all other uses to which the combination of chlorinated rubber and ricinoleate urethane polyol may be employed.

SUMMARY OF THE INVENTION

An adhesive composition consisting essentially of a solution in a suitable solvent of a ricinoleate urethane polyol and a chlorinated rubber having approximately 63% to 68% by weight chlorine, the chlorinated rubber appearing in quantities no greater than approximately 70% by weight of the combined polyol and rubber.

PREFERRED EMBODIMENT OF THE INVENTION

The aforesaid objects and advantages may be achieved from a mixture of chlorinated rubber and a ricinoleate urethane polyol preferred embodiments of which follow.

The chlorinated rubber may be made by chlorinating the isoprene units of rubber so that the finished product has from 63% to 68% by weight chlorine, having the empirical formula: $(C_{10}H_{11}CL_7)x$. Merely by way of example, the following chlorinated rubbers may be employed in this invention: PARLON S5, S10, S40, S125, S300 manufactured by Hercules, Inc., Wilmington, Delaware, and ALLOPRENE 5, 10, 20, 40 and 125 manufactured by ICI United States, Inc., Wilmington, Delaware. The difference in these products lies in their molecular weight with the product numbers being the approximate centipoise viscosity at a 20% by weight solid concentration in toluene.

The chlorinated rubber content by weight should not be more than approximately 70% of the chlorinated rubber/ricinoleate urethane polyol blend. This percentage excludes changes resulting from adding plasticizers, solvents, fillers and the like. The preferred types of chlorinated rubber for adhesives are the high molecular weight grades which result in a viscosity above 100 centipoise at a 20% by weight concentration in toluene. The preferred type of chlorinated rubber for coatings is the lower molecular weight grades that result in a viscosity below 100 centipoise at a 20% by weight concentration in toluene.

The ricinoleate urethane polyol of this invention is made by reacting an isocyanate having an average functionality of two or greater with a ricinoleate polyol having an averge hydroxyl functionality of two or greater at an isocyanate/hydroxyl (NCO/OH) ratio of no greater than 0.9/1.0. The ricinoleate urethane polyol resulting from this reaction substantially has no reactive isocyanate groups but does have residual unreacted hydroxyl groups. The methods of preparation of polyol/isocyanate adducts such as the ricinoleate urethane polyol above are well known in the art and need no further explanation.

Both aromatic and aliphatic polyisocyanates can be employed to react with the ricinoleate polyol to make the ricinoleate urethane polyol of this invention. The preferred isocyanates are toluene diisocyanate (TDI) and diphenylmethane diisocyanate (MDI). Illustrative of other suitable polisocyanates are the following: Isophorone diisocyanate (IPDI), 4,4'4" triphenylmethane triisocyanate, polymethylene polyphenyl isocyanate m-phenylene, 1-chlorophenylene 2,4 diisocyanates, methylene-bis (4-cyclohexylisocyanate) and their equivalents.

The ricinoleate polyols that may be employed to react with the polyisocyanates to produce the ricinoleate urethane polyol of this invention are diol, triol or higher polyhydric alcohol esters of ricinoleic acid. The preferred ricinoleate polyol is castor oil which is composed mostly of the triglyceride of ricinoleic acid. Illustrative of other ricinoleate polyols or castor oil derived polyols that may be employed to produce the ricinoleate urethane polyols of this invention are the following: glycerol monoricinoleate, glycerol diricinoleate, propylene glycol monoricinoleate, dipropylene glycol monoricinoleate, ethyleneglycol monoricinoleate, polyethyleneglycol monoricinoleate, pentaerythritol monoricinoleate and their equivalents. The methods of preparation of the above polyols are well known and need no further explanation.

The chlorinated rubber may be combined with the ricinoleate urethane polyol by several methods. Merely by way of illustration and without limiting the scope of the claims hereof, some of the methods are: (a) the chlorinated rubber is dissolved in the components employed in the preparation of the ricinoleate urethane polyol prior to or during the reaction process; (b) the chlorinated rubber is dissolved in the finished ricinoleate urethane polyol; and (c) the chlorinated rubber is added to the ricinoleate urethane polyol as a solution of chlorinated rubber dissolved in a solvent, or dissolved in a non-reactive resin or a non-reactive plasticizer or combination of the same; (d) a chlorinated rubber is added to the ricinoleate urethane polyol by first dissolving in isocyanates, in blocked isocyanates in reactive phenolicss, in melamine-formaldehyde, in urea-formaldehyde or other resins that will chemically react with the ricinoleate urethane polyol. In some cases when adding the chlorinated rubber by this method the chlorinated rubber would be in the part of a two-package system which reacts with the other part which is the ricinoleate urethane polyol. The following examples are illustrative of the adhesives and coatings claimed herein:

EXAMPLE I

This example discloses the formulation, properties, performance and testing of a two-package curing urethane adhesive in accordance with the invention claimed herein. The adhesive cures by the reaction of the hydroxyl groups on the ricinoleate urethane polyol with the isocyanate terminated prepolymer.

| FORMULA | Wt. | Wt. | Wt. |
|---|---|---|---|
| Part A | | | |
| Ricinoleate urethane polyol* | 35 | 35 | 35 |
| Chlorinated rubber solution (20% by weight solids)** | — | 325 | — |
| Toluene | 35 | — | 35 |
| Part B | | | |
| Isocyanate Terminated prepolymer*** | 45.3 | 45.3 | 45.3 |
| Chlorinated rubber solution (20% by weight solids)** | — | — | 325.0 |

***Castor oil/MDI prepolymer having 4.4% by weight available isocyanates as a 70% by weight solids solution in methyl ethyl ketone and toluene at 4:1 by weight.
**Hercules' Parlon S125 dissolved in toluene.
*Castor oil/TDI adduct (88/12 by weight): having 2.1% by weight available hydroxyl expressed as 100% by weight solids; with a viscosity of 90,000 cps.
Those formulas of Parts A and B which contain chlorinated rubber, when mixed result in the same composition.

Performance—The data in Table I illustrates the improvement in green strength between the control and the adhesive of this example

TABLE 1

| | | |
|---|---|---|
| Parlon S125 (% by weight of ricinoleate urethane polyol) | 0 | 65 |
| Parlon S125 (% by weight of prepolymer) | 0 | 67 |
| Parlon S125 (% by weight of total solids) | 0 | 49 |
| Finger tack | Oily | Tacky,legs |
| Green Strength (finger) | Poor | Excellent |
| Green Strength**** | 0.3 | 5.0 |
| Bond Strength (7 days)**** | 7.0 | 11.5 |

****As determined by a Scott Pendulum Type Tensile Tester the readings being employed for comparative purposes.

Mixing and Test Procedure—The data listed in Table I was determined in the following manner:

(A) Part A and B were mixed and allowed to stand at ambient temperature for thirty minutes before beginning to make test samples.

(B) Finger Tack—An 8 mil. wet film was cast on glass using a draw down blade. The film was given approximately a five minute open time to allow the solvent to evaporate. An index finger was pressed into the adhesive, withdrawn slowly, and based on its "feel" was rated as oily or tacky. In the latter case, a material rated as tacky not only had tack but also had a high green strength, legs and grab.

(C) Green Strength (Finger Test)—An 8 mil. wet film was cast on glass using a draw down blade. The film was given approximately five minutes open time in order to allow the solvent to evaporate. The relative green strength was determined subjectively by pressing an index finger into the adhesive and removing it slowly. A green strength rating of 1 or poor indicates that little force was necessary to remove one's finger and a rating of 10 or excellent means that a very high force was required to pull away from the glass.

(D) Green Strength (Scott Pendulum Type Tensile Tester)—A 5 mil. wet film, 1" wide and 3" long, was cast on an aluminum panel using a draw down blade. After five minute open time to allow the solvent to evaporate, a piece of natural cotton fabric was pressed into the adhesive and rolled using a 2 pound weight. The relative green strength of this lamination was determined by immediately placing it in the Scott Pendulum Type Tensile Tester and pulling the aluminum and fabric in opposite directions (shear adhesion). The numbers recorded were direct readings from the tester with the lowest numbers being the poorest green strength and the highest numbers being the strongest.

(E) Bond Strength—The solution was applied to two pieces of 1" wide natural cotton fabric using a paint brush. After a five minute open time to allow the solvent to evaporate, the two coated pieces of fabric were then pressed together like contact cement. After curing, the samples were subjected to a 90° Peel Strength Test using the Scott Pendulum Type Tensile Tester by pulling apart at a rate of about 2 inches/minute. The numbers shown are the direct readings from the tester with the lowest number being the weakest bond and the highest number being the strongest peel strength.

EXAMPLE II

The principal difference between the two-package curing urethane adhesive of this example and that of Example I is that a higher molecular weight chlorinated rubber and a different isocyanate terminated prepolymer were employed. The test procedures were the same as in Example I.

| FORMULA | Wt. | Wt. |
|---|---|---|
| Part A | | |
| Ricinoleate urethane polyol* | 780 | 780 |
| Chlorinated rubber solution (20% by weight solids)** | — | 205 |
| Dibutyltin dilaurate catalyst | 1 | 1 |
| Toluene | 205 | 41 |
| Part B | | |
| Isocyanate terminated prepolymer*** | 404 | 404 |

*Castor oil/TDI adduct: having 2.1% by weight available hydroxyl expressed as 100% by weight solids with a viscosity of 90,000 cps.
**Hercules' Parlon S300 dissolved in toluene.
***Mobay Chemical Mondur CB 60: Trimethylol propane/TDI prepolymer having 10.5% by molecular weight available isocyanate as a 60% by weight solids solution in ethylene glycol acetate and xylene at 25:15 by weight.

Performance—The data in Table II illustrates the improvement in green strength between the adhesive of the control and that of this example.

TABLE II

| Parlon S300, (% by weight ricinoleate urethane polyol) | 0 | 5.0 |
|---|---|---|
| Parlon S300, (% by weight total solids) | 0 | 3.9 |
| Finger Tack | Oily | Tacky, legs |
| Green strength (finger) | Poor | Excellent |
| Green Strength**** | 0.2 | 0.7 |
| Bond Strength (48 hrs.)**** | 3 | 4 |

****As determined by a Scott Pendulum Type Tensile Tester; the readings being employed for comparative purposes.

EXAMPLE III

The principal difference between the adhesive of this example and that of Example II is that the ricinoleate urethane polyol in this example was made from the reaction of castor oil/MDI whereas in Example II, it was made from castor oil/TDI. The test procedures were the same as in Example I.

| FORMULA | Wt. | Wt. |
|---|---|---|
| Part A | | |
| Ricinoleate urethane polyol* | 1084 | 1084 |
| Chlorinated rubber solution (20% by weight solids)** | — | 143 |
| Toluene | 542 | 456 |
| Dibutyltin dilaurate catalyst | 1.0 | 1.0 |
| Part B | | |
| Isocyanate terminated urethane prepolymer*** | 404 | 404 |

*Castor oil/MDI adduct: having 1.6% by weight available hydroxyl as a 50% by weight solids solution in methyl ethyl ketone and toluene at 1:1 by weight.
**Hercules' Parlon S300 dissolved in toluene.
***Mobay Chemical Mondur CB 60: Trimethylol propane/TDI prepolymer having 10.5% by weight available isocyanate as a 60% by weight solids solution in ethylene glycol acetate and xylene at 25:15 by weight.

Performance—The data in Table III illustrates the difference in green strength between the adhesive of the control and that of this example.

TABLE III

| Parlon S300, (% by weight of ricinoleate urethane polyol) | 0 | 5.0 |
|---|---|---|
| Parlon S300, (% by weight of total solids) | 0 | 3.9 |
| Finger Tack | Oily | Tacky, legs |
| Green Strength (Finger) | Poor | Excellent |
| Green Strength**** | 0.1 | 0.7 |
| Bond Strength (7 days)**** | 2.5 | 4.5 |

****As determined by a Scott Pendulum Type Tensile Tester; the readings being employed for comparative purposes.

EXAMPLE IV

This example discloses the formulation, properties, performance and testing of a non-curing pressure sensitive adhesive in accordance with this invention. It develops its properties when the solvent evaporates and without undergoing further chemical reaction whereas in Examples I, II, and III the adhesives cure by reaction.

| FORMULA | A | B |
|---|---|---|
| Ricinoleate urethane polyol (50% by weight solids)* | 180 | 180 |
| Chlorinated rubber solution (20% by weight solids)** | — | 50 |
| Toluene | 27 | — |

*Castor oil/TDI adduct having 0.9% by weight available hydroxyl as a 50% by weight solids solution in acetone and ethyl acetate at 65:35 by weight with a viscosity of 120 cps.
**Hercules' Parlon S300 dissolved in toluene.

Performance—The data in Table IV illustrates the difference in bond strength between the adhesive of the control and that of this example.

TABLE IV

| Parlon S300, (% by weight of total solids) | 0 | 10 |
|---|---|---|
| Bond strength*** | 0.2 | 6.0 (Paper tears) |

***As determined by a Scott Pendulum Type Tensile Tester; the readings being employed for comparative purposes.

Test Procedure—An 8 mil. wet film was cast on clay coated paper using a draw down blade. It was then dried for ten minutes at ambient temperature and for an additional five minutes at 138° F. to drive off all of the solvent. After cooling to room temperature a 1 inch wide piece was pressed on a piece of cold rolled steel. The samples were subjected to a 180° Peel Strength Test using the Scott Pendulum Type Tensile Tester by pulling at a rate of about 12 inches/minute. The numbers shown are direct readings from the tester with the lower numbers being the weaker bond and the higher numbers being the stronger bond.

EXAMPLE V

The principal difference between the pressure-sensitive adhesive of this example and that of Example IV is that in this example the ricinoleate urethane polyol was made from an aliphatic isocyanate whereas in Example IV an aromatic isocyanate was employed. The test procedures were the same as Example IV.

| FORMULA | Wt. | Wt. |
|---|---|---|
| Ricinoleate urethane polyol* | 170 | 170 |
| Chlorinated rubber solution (20% by | | |

-continued

| FORMULA | Wt. | Wt. |
|---|---|---|
| weight solids)** | — | 75 |

*Castor oil/IPDI adduct having 0.9% by weight theoretically available hydroxyl as a 50% by weight solids solution in methyl ethyl ketone and toluene at 1:1 by weight.
**Hercules' Parlon S300 dissolved in toluene.

Performance—The data in Table V illustrates the difference between the control and the adhesive of this example.

TABLE V

| Parlon S300, (% by weight of total solids) | 0 | 15 |
|---|---|---|
| Finger tack | Oily | Moderate |
| Bond strength*** | 0 | 0.5 |

***As determined by a Scott Pendulum Type Tensile Tester, the readings being employed for comparative purposes.

EXAMPLE VI

This example discloses a one-package, thermoplastic coating that dries by solvent evaporation. The principal difference between the coating of this example and that of Example VII is that in Example VII the coating is a two-package system that cures by reaction instead of remaining thermoplastic.

| FORMULA | Wt. |
|---|---|
| Ricinoleate urethane polyol* | 30 |
| Chlorinated rubber solution (25% by weight solids)** | 80 |

*Castor oil/TDI adduct having 2.1% by weight available hydroxyl as a 100% by weight solids solution with a viscosity of 90,000 cps.
**Hercules' Parlon S10 dissolved in toluene.

Performance—The data in Table VI illustrates that composition of this invention can be employed to make a one-package thermoplastic coating that dries by solvent evaporation.

TABLE VI

| Parlon S10, (% by weight solids) | 40 |
|---|---|
| Hardness (Sward Rocker), 24 hour dry*** | 8 |
| Water spot test*** | A |
| 10% potassium hydroxide spot test*** | A |
| 95% ethyl alcohol spot test*** | A |

Test Procedure - ***An 8 mil. wet film was cast on glass using a draw down blade. After an overnight dry, the sward hardness was determined. Resistance to attack from splashing chemicals was determined by putting two drops of the liquid test solution on the film and rubbing lightly with a finger. If there was no noticeable softening or change in appearance, the film was rated "A" for acceptable.

EXAMPLE VII

The principal difference between this example and Example II is that in this example the formulation is evaluated as a coating using a low molecular weight chlorinated rubber whereas Example II was evaluated as an adhesive using a high molecular weight chlorinated rubber.

| FORMULA | Wt. | Wt. | Wt. |
|---|---|---|---|
| Part A | | | |
| Ricinoleate urethane polyol* | 780 | 780 | 780 |
| Chlorinated rubber solution (25% by weight solids)** | — | 1337 | 2080 |
| Toluene | 1170 | — | — |
| Dibutyltin dilaurate catalyst | 1.0 | 1.0 | 1.0 |
| Part B | | | |
| Isocyanate terminated pre- | | | |

| FORMULA | Wt. | Wt. | Wt. |
|---|---|---|---|
| polymer*** | 404 | 404 | 404 |

*Castor oil/TDI adduct having 2.1% by weight available hydroxyl as a 100% by weight solids solution with a viscosity of 90,000 cps.
**Hercules' Parlon S10 dissolved in toluene.
***Mobay Chemical Mondur CB 60: Trimethylol propane/TDI prepolymer having 10.5% by weight available isocyanate as a 60% by weight solids solution in ethylene glycol acetate and xylene at 25:15 by weight.

Performance—The data in Table VII illustrates the improvement in film hardness and improvement in concrete adhesion of the coating of this example as compared to that of the control.

TABLE VII

| Parlon S10, (% by weight of ricinoleate urethane polyol) | 0 | 30 | 60 |
|---|---|---|---|
| Parlon S10, (% by weight of total solids) | 0 | 25 | 34 |
| Hardness (Sward Rocker), 4 hours | 0 | 4 | 8 |
| Hardness (Sward Rocker), 24 hours | 4 | 10 | 21 |
| Wet concrete adhesion | Poor | Fair | Good |

Mixing and Test Procedure—The data listed in Table VII was determined in the following manner:

(A) Part A and Part B were mixed and allowed to stand at ambient temperature for approximately thirty minutes before beginning to make test samples.

(B) Hardness—An 8 mil. wet film was cast on glass using a draw down blade. After allowing an air dry for the time indicated in the table, the hardness was determined using a Sward Rocker; the higher the number the greater the hardness.

(C) Wet Concrete Adhesion—The solution was brushed on a block of concrete and allowed to cure at room temperature for 3 days. The block was then immersed in water for 24 hours. The adhesion was determined subjectively by picking at it with a knife point.

It will be understood by those skilled in the art that many modifications and variations of the present invention may be made without departing from the spirit and the scope thereof.

What is claimed is:

1. An adhesive composition consisting essentially of a solution in a suitable solvent of
   (a) a ricinoleate urethane polyol, and
   (b) a chlorinated rubber having approximately 63% to 68% by weight chlorine and appearing in quantities no greater than approximately 70% by weight of the combined polyol and rubber.

2. An adhesive composition in accordance with claim 1 in which
   (a) the ricinoleate urethane polyol is prepared from reacting an isocyanate having a functionality of at least 2 with a ricinoleate polyol having a functionality of at least 2 at an isocyanate to hydroxyl ratio (NCO/OH) no greater than approximately 0.9/1.0.

3. An adhesive composition in accordance with claim 1 in which
   (a) the said composition capable of cross-linking is an isocyanate terminated prepolymer.

4. An adhesive composition in accordance with claim 3 in which
   (a) the said prepolymer is prepared by reacting a ricinoleate polyol with isophorone diisocyanate.

5. An adhesive composition in accordance with claim 3 in which (a) the said prepolymer is prepared by reacting a ricinoleate polyol with diphenylmethane diisocyanate.

6. An adhesive composition in accordance with claim 3 in which
   (a) the said isocyanate terminated prepolymer is prepared by reacting a castor oil with the said isocyanate.

7. An adhesive composition in accordance with claim 2, in which
   (a) the ricinoleate urethane polyol is prepared by reacting a ricinoleate polyol with toluene diisocyanate.

8. An adhesive composition in accordance with claim 3 in which
   (a) the said prepolymer is an isocyanate terminated ricinoleate prepolymer.

9. An adhesive composition in accordance with claim 3 in which
   (a) the said prepolymer is prepared by reacting a ricinoleate polyol with toluene diisocyanate.

10. An adhesive composition in accordance with claim 3 in which
    (a) the said prepolymer is prepared by reacting a ricinoleate polyol with methylene-bis (4cyclohexylisocyanate).

11. An adhesive composition in accordance with claim 3 in which
    (a) the said isocyanate terminated prepolymer is prepared from reacting trimethylol propane with an isocyanate.

12. An adhesive composition in accordance with claim 2 in which
    (a) the ricinoleate urethane polyol is prepared by reacting a ricinoleate polyol with diphenylmethane diisocyanate.

13. An adhesive composition in accordance with claim 2 in which
    (a) the ricinoleate urethane polyol is prepared by reacting a ricinoleate polyol with methylene-bis (4-cyclohexylisocyanate).

14. An adhesive composition in accordance with claim 2 in which
    (a) the ricinoleate urethane polyol is prepared by reacting a ricinoleate polyol with isophorone diisocyanate.

15. An adhesive composition in accordance with claim 1 in which
    (a) the chlorinated rubber is prepared by chlorinating the isoprene units of rubber.

16. An adhesive composition in accordance with claim 15 in which
    (a) the ricinoleate urethane polyol is prepared by reacting a ricinoleate polyol with toluene diisocyanate.

17. An adhesive composition in accordance with claim 15 in which
    (a) the ricinoleate urethane polyol is prepared by reacting a ricinoleate polyol with diphenylmethane diisocyanate.

18. An adhesive composition in accordance with claim 15 in which
    (a) the ricinoleate urethane polyol is prepared by reacting a ricinoleate polyol with methylene-bis(4-cyclohexylisocyanate).

19. An adhesive composition in accordance with claim 15 in which
    (a) the ricinoleate urethane polyol is prepared by reacting a ricinoleate polyol with isophorone diisocyanate.

20. An adhesive composition in accordance with claim 1 in which
    (a) the ricinoleate urethane polyol is prepared by reacting a ricinoleate polyol with toluene diisocyanate.

21. An adhesive composition in accordance with claim 1 in which
    (a) the ricinoleate urethane polyol is prepared by reacting a ricinoleate polyol with diphenylmethane diisocyanate.

22. An adhesive composition in accordance with claim 1 in which
    (a) the ricinoleate urethane polyol is prepared by reacting a ricinoleate polyol with methylene-bis (4-cyclohexylisocyanate).

23. An adhesive composition in accordance with claim 1 in which
    (a) the ricinoleate urethane polyol is prepared by reacting a ricinoleate polyol with isophorone diisocyanate.

24. An adhesive composition in accordance with claim 1 in which
    (a) the ricinoleate urethane polyol is prepared by reacting an isocyanate having a functionality of at least 2 with castor oil.

25. An adhesive composition in accordance with claim 24 in which
    (a) the ricinoleate urethane polyol is prepared from reacting castor oil with diphenylmethane diisocyanate.

26. An adhesive composition in accordance with claim 24 in which
    (a) the ricinoleate urethane polyol is prepared from reacting castor oil with toluene diisocyanate.

27. An adhesive composition in accordance with claim 24 in which
    (a) the ricinoleate urethane polyol is prepared from reacting castor oil with isophorone diisocyanate.

28. An adhesive composition in accordance with claim 24 in which
    (a) the ricinoleate urethane polyol is prepared by reacting methylene-bis (4-cyclohexylisocyanate) with castor oil.

29. An adhesive composition in accordance with any one of claims 1, 2, 3, 4, 5, 6, 7, 8, 9, 10, 11, 12, 21, 22, 23, 24, 25, 26, 27 or 28 and
    (a) a composition capable of cross-linking the ricinoleate urethane poloyl.

30. An adhesive composition in accordance with claim 29 in which,
    (a) the said composition capable of cross-linking is an isocyanate having a functionality of at least 2.

* * * * *

UNITED STATES PATENT AND TRADEMARK OFFICE
CERTIFICATE OF CORRECTION

PATENT NO. : 4,256,615

DATED : March 17, 1981

INVENTOR(S) : Norris R. Legue

It is certified that error appears in the above—identified patent and that said Letters Patent is hereby corrected as shown below:

Column 2, line 31, after "S10," insert -- S20 --.

Column 3, line 40, after "tive" delete "phenolicss" and insert -- phenolics --.

Claim 3, after "claim" delete "1" and insert -- 29 --.

Signed and Sealed this

Fourth Day of August 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,256,615
DATED     : July 7, 1981
INVENTOR(S) : Norris R. Legue

It is certified that error appears in the above—identified patent and that said Letters Patent is hereby corrected as shown below:

Column 10, claim 29, should read as shown below:

-- 29. An adhesive composition in accordance with any one of Claims 1, 2, 7, 12, 13, 14, 15, 16, 17, 18, 19, 20, 21, 22, 23, 24, 25, 26, 27 or 28 and (a) A composition capable of crosslinking ricinoleate urethane polyol. --.

Signed and Sealed this

Thirteenth Day of October 1981

[SEAL]

Attest:

GERALD J. MOSSINGHOFF

Attesting Officer     Commissioner of Patents and Trademarks